UNITED STATES PATENT OFFICE.

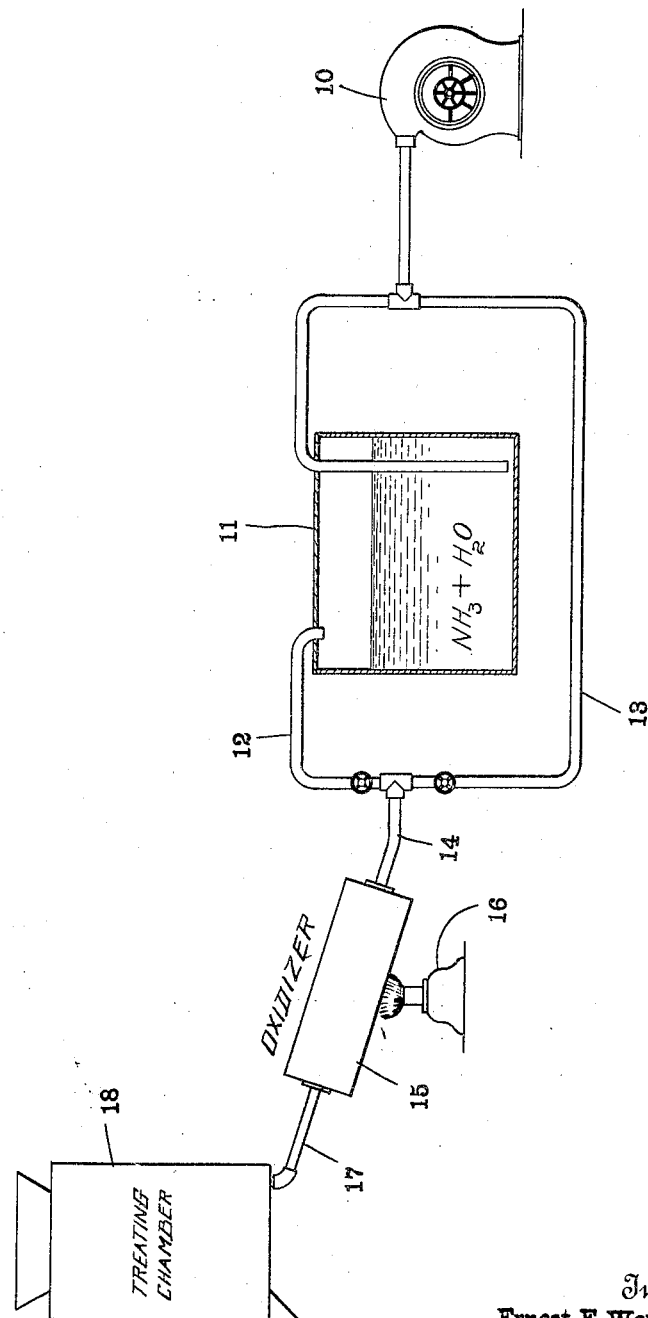

ERNEST E. WERNER, OF INDIANAPOLIS, INDIANA.

ART OF TREATING FLOUR.

No. 812,777.   Specification of Letters Patent.   Patented Feb. 13, 1906.

Application filed April 20, 1905. Serial No. 256,588.

*To all whom it may concern:*

Be it known that I, ERNEST E. WERNER, a citizen of the United States, residing at Indianapolis, in the county of Marion and State of Indiana, have discovered certain new and useful Improvements in the Art of Treating Flour, of which the following is a specification.

In the commercial production of cereal flour it is desirable that the natural color be modified, and my present discovery relates to a simple but efficient process for accomplishing such desirable modification. A color modification has been produced by Frichot, as described in his British Patent No. 21,971 of 1898, by subjecting a current of air to the action of an electric arc and subjecting the flour to the resultant gas. Another process is described by Andrews *et al.* in United States Patent No. 693,207, of February 11, 1902, which process consists in subjecting flour to the action of gaseous nitrogen peroxid produced by adding iron sulfate to nitric acid, and recently Patents Nos. 758,883 and 758,884, of May 3, 1904, and No. 759,651, of May 10, 1904, have been granted to Alsop for a process for the same purpose, in which the treating-gas is produced by subjecting a current of air to the action of a flaming electric discharge. The carrying out of these various processes requires considerable complicated apparatus, and the resulting product is one in which the bloom of the flour is destroyed, the product being a bluish white.

I have discovered that by decomposing ammonia in the presence of an oxidizing agent I obtain a resultant gas which if applied to a cereal flour or to the cereals themselves will have a bleaching effect upon the flour, which, however, will not destroy the peculiar bloom which is a characteristic of a high-grade product.

In carrying out my process I can blow air through aqua-ammonia and pass the ammonia-laden current, together with a desirable quantity of unladen air, through a heated chamber containing a metallic substance capabl. of supplying oxygen—*i. e.*, such as platinum sponge or a metallic oxid, like copper oxid—and permit the resulting gas to pass into any desirable form of chamber or agitator through which the flour or grain is passed.

The accompanying drawing illustrates diagrammatically an apparatus by means of which my process may be practiced, 10 indicating a suitable air-pump; 11, a reservoir for aqua-ammonia; 12, a valved passage leading from said reservoir; 13, a valved passage leading from the air-pump; 14, a pipe into which the two pipes 12 and 13 discharge; 15, a containing-chamber for the oxygen-supplying material; 16, a means for heating said chamber; 17, a pipe leading from said chamber to the treating-chamber 18, through which the flour or grain is passed.

While I have shown an apparatus in which aqua-ammonia is used, it is of course to be understood that any material capable of supplying ammonia—as, for instance, liquid ammonia—may be used in carrying out my process without departing from the spirit of the invention.

I claim as my discovery—

1. That improvement in the art of treating cereals which consists in subjecting the same to the action of the gas resulting from the decomposition of ammonia in the presence of oxygen.

2. That improvement in the art of treating cereals which consists in subjecting the same to the action of the gas resulting from the decomposition of ammonia in the presence of an oxidizing agent.

3. That improvement in the art of treating cereals which consists in passing ammonia over a heated metallic substance capable of yielding oxygen, and subjecting the cereal to the action of the resulting gas.

4. That improvement in the art of treating cereals which consists in passing ammonia over a heated metallic oxid and subjecting the cereal to the action of the resulting gas.

5. That improvement in the art of treating cereals which consists in subjecting the same to the action of the gas resulting from passing ammonia over a heated metallic oxid.

6. That improvement in the art of treating cereals which consists in subjecting the same to the action of the gas resulting from passing ammonia over a heated metallic substance capable of yielding oxygen.

7. That improvement in the art of treating cereals which consists in subjecting the same to the action of the gas resulting from passing ammonia over a heated substance capable of yielding oxygen.

8. That improvement in the art of treating cereals which consists in subjecting the same to the action of the gas resulting from passing ammonia over heated copper oxid.

9. That improvement in the art of treating cereals which consists in passing ammonia over heated copper oxid and subjecting the cereal to the resultant gas.

10. That improvement in the art of treating cereals which consists in subjecting the same to the gas resulting from the mixture of air and the gas resulting from the passage of an air-current laden with vapor of aqua-ammonia over a heated metallic oxid.

11. That improvement in the art of treating cereals which consists in subjecting the same to the gas resulting from the mixture of air and the gas resulting from the passage of an air-current laden with vapor of aqua-ammonia over a metallic substance capable of yielding oxygen.

12. That improvement in the art of treating cereals which consists in forcing air through aqua-ammonia, mixing the resultant vapor with air, passing the mixture over a heated metallic oxid and subjecting the cereal to the action of the resultant gas.

13. That improvement in the art of treating cereals which consists in forcing air through aqua-ammonia, mixing the resultant vapor with air, passing the mixture over a heated metallic substance capable of yielding oxygen, and subjecting the cereal to the action of the resultant gas.

14. That improvement in the art of treating cereals which consists in forcing air through aqua-ammonia, mixing the resulting vapor with air, passing the mixture over heated copper oxid, and subjecting the cereal to the action of the resulting gas.

15. That improvement in the art of treating cereals which consists in subjecting the same to the action of the gas resulting in passing ammonia over a substance capable of yielding oxygen thereto in condition to react thereon.

16. That improvement in the art of treating cereals which consists in subjecting the same to the gas resulting from the mixture of air and the gas resulting from the passage of an air-current laden with gaseous ammonia over a substance capable of yielding oxygen thereto in condition to react thereon.

In witness whereof I have hereunto set my hand and seal, at Indianapolis, Indiana, this 15th day of April, A. D. 1905.

ERNEST E. WERNER. [L. S.]

Witnesses:
ARTHUR M. HOOD,
JAMES A. WALSH.